(12) United States Patent
Diorio et al.

(10) Patent No.: US 9,024,729 B1
(45) Date of Patent: May 5, 2015

(54) NETWORK-ENABLED RFID TAG ENDORSEMENT

(75) Inventors: Christopher J. Diorio, Shoreline, WA (US); Larry Arnstein, Seattle, WA (US); Scott A. Cooper, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 461 days.

(21) Appl. No.: 13/441,285

(22) Filed: Apr. 6, 2012

Related U.S. Application Data

(60) Provisional application No. 61/473,501, filed on Apr. 8, 2011.

(51) Int. Cl.
*G06K 7/00* (2006.01)
*G06K 7/10* (2006.01)

(52) U.S. Cl.
CPC ................... *G06K 7/10009* (2013.01)

(58) Field of Classification Search
CPC ...... G06K 7/10009; G06F 21/33; G06F 21/35
USPC .................... 340/10.42, 10.1, 572.1
See application file for complete search history.

(56) References Cited

U.S. PATENT DOCUMENTS

| | | | |
|---|---|---|---|
| 8,049,594 B1 * | 11/2011 | Baranowski | 340/5.61 |
| 8,378,786 B2 * | 2/2013 | Bailey et al. | 340/10.1 |
| 2006/0077034 A1 * | 4/2006 | Hillier | 340/5.61 |
| 2007/0106897 A1 * | 5/2007 | Kulakowski | 713/171 |
| 2010/0001840 A1 * | 1/2010 | Kang et al. | 340/10.1 |

OTHER PUBLICATIONS

Final Office Action received for U.S. Appl. No. 13/308,123, mailed May 22, 2014 and filed on Nov. 30, 2011.
Office Action received for U.S. Appl. No. 13/308,123, mailed Oct. 8, 2013 and filed on Nov. 30, 2011.
Non-Final Office Action for U.S. Appl. 13/308,123 filed Nov. 30, 2011, and mailed on Oct. 8, 2013.

* cited by examiner

*Primary Examiner* — Edwin Holloway, III
(74) *Attorney, Agent, or Firm* — Turk IP Law, LLC

(57) ABSTRACT

A Radio Frequency Identification (RFID) reader endorses an RFID tag by receiving an identifier from the tag; determining a certificate from the tag; challenging the tag with a challenge; receiving a response from the tag; sending a first message including at least the identifier, challenge, and response to a verification authority; sending a second message including at least the identifier and certificate to a certification authority; receiving a first reply from the verification authority; and receiving a second reply from the certification authority. The verification authority may notify a designated party if the response is incorrect or the certification authority may notify the designated party if the certificate is not supported.

23 Claims, 13 Drawing Sheets

*RFID SYSTEM*

ARCHITECTURE OF INTERFACE CONVERTER
WITH AGENT AND UTILITY

SAMPLE SCREENSHOT OF INTERFACE
CONVERTER EXPOSING TO AGENT OPTIONS TO
CONTROL FUNCTIONALITY OF TAG
AUTHENTICATION UTILITY

NETWORK-ENABLED RFID TAG ENDORSEMENT

CROSS REFERENCE TO RELATED APPLICATIONS

This application claims the benefit of U.S. Provisional Patent Application Ser. No. 61/473,501 filed on Apr. 8, 2011. The disclosures of the provisional patent application are hereby incorporated by reference for all purposes.

This application may be found to be related to the following applications:

Application titled "NETWORK-ENABLED RFID TAG AUTHORIZATION", application Ser. No. 13/308,123, filed with the USPTO on Nov. 30, 2011, which is incorporated herein by reference; and Application titled "RFID TAGS THAT BACKSCATTER MORE CODES", application Ser. No. 13/423,256, filed with the USPTO on Mar. 18, 2012 which is incorporated herein by reference; and Application titled "RFID TAG AND READER AUTHENTICATION BY TRUSTED AUTHORITY", application Ser. No. 13/396,899, filed with the USPTO on Feb. 15, 2012, which is incorporated herein by reference.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are particularly useful in product- and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag generates the transmitted back RF wave either originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna system, a radio section, a power management section, and frequently a logical section, a memory, or both. In some RFID tags the logical section may include a cryptographic algorithm which, in many instances, relies on one or more passwords or keys stored in tag memory. In earlier RFID tags the power management section included an energy storage device such as a battery. RFID tags with an energy storage device are known as battery-assisted, semi-active, or active tags. Advances in semiconductor technology have miniaturized the electronics so much that an RFID tag can be powered solely by the RF signal it receives. Such RFID tags do not include an energy storage device such as a battery, and are called passive tags. Of course, even passive tags typically include temporary energy- and data/flag storage elements such as capacitors or inductors.

Counterfeiting is a problem in many areas of global commerce. Many RFID-enabled applications need to verify the authenticity of the RFID tags, readers, and system components used in the application, and also need to verify attributes of the items to which the tags are attached. For example, a retailer receiving a shipment of tagged garments may need to verify whether the tags, and by implication the garments to which the tags are attached, are authentic; the retailer may also need to verify attributes of the garments, such as that they were manufactured with organic cotton.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID reader, or an RFID system that includes a reader, endorsing an RFID tag. The reader receives an identifier from the tag, determines a tag certificate, and challenges the tag with a challenge. After receiving a response from the tag, the reader then sends a first message including at least the identifier, challenge, and response to a verification authority and sends a second message including at least the identifier and the tag certificate to a certification authority. The reader then receives a first reply from the verification authority and a second reply from the certification authority. In some embodiments, the verification and/or certification authority may notify a designated party if the response from the tag is incorrect or the certificate is invalid or unsupported.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

Figure 1:
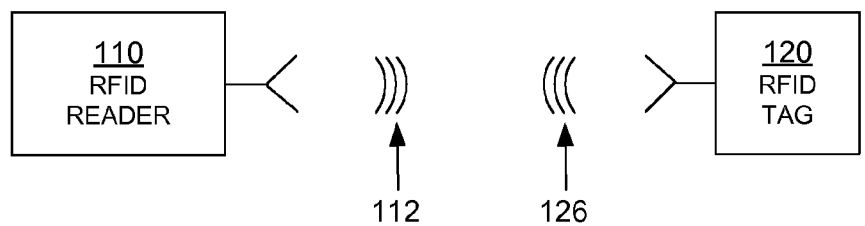
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Embodiments are directed to a Radio-Frequency Identification (RFID) system endorsing an RFID tag. Endorsement includes but is not limited to authenticating the RFID tag to determine the legitimacy of the tag and/or the object to which the tag is attached, and validating one or more certificates that embody assertions that the tag and/or the object to which the tag is attached possess one or more properties.

The tag includes a secret, also known as a key, which is typically not readable by an RFID reader but is known to a verification authority accessible by the reader over a network. The tag also includes an identifier (ID) such as but not limited to a tag identifier (TID), key identifier (KID), unique item identifier (UII), electronic product code (EPC), or a serialized trade identification number (SGTIN). Finally, the tag includes or provides a means for a reader to develop one or more certificates embodying properties such as: make and model; country of origin; size; weight; region of sale; labor practices; farming practices; energy usage; hazardous or non-hazardous; approval by NGOs, governments, laboratories, or other organizations; allergens; safety; customer satisfaction ratings; IP licensure, or other similar properties.

To authenticate a tag (i.e., determine the tag's legitimacy), the reader interrogates the tag to determine the tag's ID, challenges the tag with a random number or string, receives a response from the tag, and then sends the ID, challenge, and response to the verification authority. In some applications each individual RFID tag or group of tags will contain a distinct key, and the verification authority can determine which key a particular tag employs by using the ID as a table lookup or input to an algorithmic key generator. The tag computes its response from at least the challenge and the key, typically using a cryptographic algorithm. In some applications the tag may add some tag-generated randomness to the reader's challenge to enhance the security of the challenge-response algorithm. Because the verification authority must be able to reconstruct the challenge that the tag used in its computations, in these latter applications the tag either sends its tag-generated randomness to the reader for relaying to the verification authority, or provides sufficient information in its ID and response for the verification authority to determine the tag-generated randomness algorithmically. In some applications, to further enhance security, the tag may encrypt its tag-generated randomness in an Initial Value (IV) and send the IV to the reader for relaying to the verification authority. In yet other applications the verification authority will generate the challenge and send it to the reader for relaying to the tag.

The verification authority uses the challenge and its knowledge of the tag's key and cryptographic algorithm to confirm or refute the tag's response and thereby ascertain the tag's or item's authenticity. In some applications, such as a consumer using an RFID-enabled mobile phone to interrogate a product (like a designer purse) prior to purchase, the verification authority will send a reply to the phone indicating whether the item is authentic or counterfeit. In other applications, such as a pharmaceutical distributor using an RFID-enabled handheld reader to interrogate a shipment (such as a case of medicine), the verification authority may send a notification to a designated party such as the distributor's security office or, in some instances, directly to the police in the event of counterfeit medicine.

To truly authenticate a tag, the reader or designated party needs to know that the verification authority's reply or notification is genuine and has not been forged or altered. Said another way, the entity receiving the reply or notification needs to be able to verify that the reply or notification is from a trusted verification authority and was not forged by an illegitimate verification authority or altered during transmission. Embodiments are therefore directed to the verification authority signing the reply or notification using an electronic signature, and the receiving entity verifying the signed reply such as by using a public or private key of the verification authority to which the reader sent the ID, challenge and response.

As described above, tags may have certificates that embody one or more assertions about the tag or tagged product. To validate a tag/product (i.e., determine that certificate(s) embodying assertions about the tag/product are valid), the reader interrogates the tag to determine the tag's ID, determines one or more certificates for the tag, and then sends the ID and the one or more certificates to one or more certification authorities. A certification authority may respond by supporting (confirming) or refuting a certificate. In typical applications a certification authority uses the tag's ID as a table lookup for a tag's known properties, or as an input to an algorithmic generator that produces a tag's properties.

A reader that receives a confirming reply from a certification authority, or a reply specifying a property that the tag or tagged item possesses, for a tag that the reader knows to be genuine based on a confirming reply from a verification authority, can ascertain that the tag or item to which the tag is attached possesses the ascribed property. In some applications, such as a consumer using an RFID-enabled mobile phone to interrogate a product (like a designer purse) prior to purchase, the certification authority may send a reply indicating that the purse was made without using child labor. In other applications, such as a pharmaceutical distributor using an RFID-enabled handheld reader to interrogate a shipment (such as a case of medicine), the certification authority may send a notification to a designated party such as the distributor's security office or, in some instances, directly to the police in the event of a mismatched property such as an incorrect port-of-origin.

As described above, a certificate includes or designates a property. It may also include the name or location of the certification authority that can support, provide, or refute the asserted property. To truly validate a tag, the reader or designated party may need to know that the certification authority's reply or notification is genuine and has not been forged or altered. Said another way, the entity receiving the reply or notification may need to be able to verify that the reply or notification is from a trusted certification authority and was not forged by an illegitimate certification authority or altered during transmission. Embodiments are therefore directed to the certification authority signing the reply or notification using an electronic signature, and the receiving entity verifying the signed reply such as by using a public or private key of the certification authority.

In some applications the reader may read a certificate directly from the tag. In other applications the reader may construct a certificate from the tag ID and one or more assertions accessible to the reader. The read or constructed certificate may include a URL that identifies the internet address of the certification authority. In some instances the certificate describes a property or properties. In some instances the certification authority provides the property or properties based on the certificate.

In some applications the verification authority and the certification authority are the same entity. In some applications the reader sends the ID, challenge, response, and certificates solely to the verification authority, which in turn routes the ID and certificates to appropriate certification authorities. In some applications the reader sends the ID, challenge, response, and certificates solely to the certification authority, which in turn routes the ID, challenge, and response to the appropriate verification authority. And in some instances the reader sends the ID, challenge, and response to the verification authority, and also sends the ID and certificates to the appropriate certification authorities. Routing may include altering, reorganizing, reformatting, combining, or splitting apart one or more messages prior to transmission.

In some applications the certification authority may pre-register certificates at the verification authority in advance, so that the verification authority can act as a proxy for the certification authority and support or refute a tag's certificates without routing a message to the certification authority.

For both the verification authority and the certification authority or authorities, the network may be available in real-time, meaning that the reader can engage with the authorities on a message-by-message basis, or the network may be non-real-time, meaning that the reader will store its messages and transmit them to the authorities when the network is available.

FIG. 1 is a diagram of components of a typical RFID system 100, incorporating embodiments. An RFID reader 110 transmits an interrogating radio frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Data exchange can be performed in a number of ways. Protocols are devised for readers and tags to exchange symbols, also called RFID symbols. A symbol for communicating can be a delimiter, a calibration symbol, and so on. Symbols can encode binary data, such as "0" and "1", if desired. When symbols are processed internally by reader 110 and tag 120 they can be considered and treated as numbers having corresponding values, and so on.

RFID tag 120 can be a passive, battery-assisted, or active tag. If RFID tag 120 is a passive tag, it is powered from wave 112.

Figure 2:
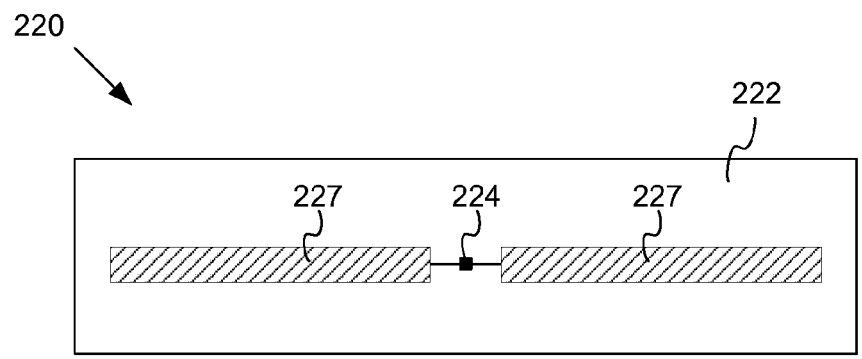
FIG. 2 is a diagram showing components of a passive RFID tag, such as a tag that can be used in the system of FIG. 1.

FIG. 2 is a diagram of an RFID tag 220, which can be the same as RFID tag 120 of FIG. 1. RFID tag 220 is shown as a passive tag. Regardless, much of what is described in this document also applies to semi-active and active tags.

RFID tag 220 is often formed on a substantially planar inlay 222, which can be made in many ways known in the art. RFID tag 220 includes an electrical circuit 224 which is preferably implemented as an integrated circuit (IC). IC 224 is arranged on inlay 222.

RFID tag 220 also includes an antenna for exchanging wireless signals with the environment. The antenna is often flat and attached to inlay 222. IC 224 is electrically coupled to the antenna via suitable antenna terminals (not shown in FIG. 2).

The antenna may be made in a number of ways. In the example of FIG. 2, the antenna is made from two distinct antenna segments 227, which are shown here forming a dipole. Many other embodiments are possible, using any number of antenna segments. In some embodiments the antenna can comprise a single segment, and different points of the single segment can be coupled to one or more of the antenna terminals of IC 224. For example, the antenna can be a loop, with its ends coupled to the IC terminals. It should be remembered that even a single antenna segment can behave like multiple segments at the frequencies of RFID wireless communication.

In operation, a signal is received by the antenna and communicated to IC 224. IC 224 both harvests power, and responds if appropriate, based on the incoming signal and the IC's internal state. IC 224 may respond by modulating the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments the antenna segments may be formed on IC 224. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
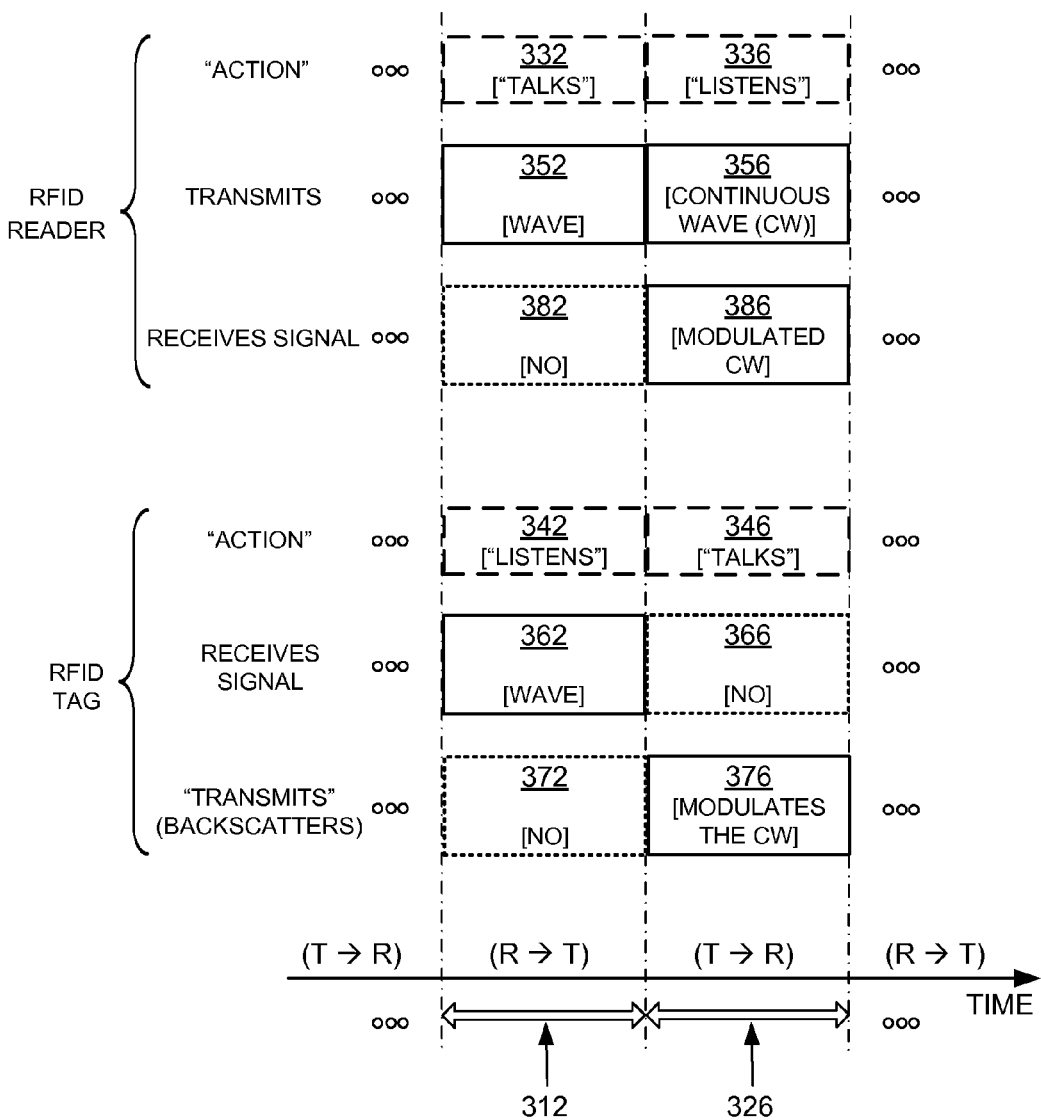
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when RFID reader 110 talks to RFID tag 120 the communication session is designated as "R→T", and when RFID tag 120 talks to RFID reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while RFID reader 110 talks (during interval 312), and talks while RFID reader 110 listens (during interval 326).

In terms of actual technical behavior, during interval 312, RFID reader 110 talks to RFID tag 120 as follows. According to block 352, RFID reader 110 transmits wave 112, which was first described in FIG. 1. At the same time, according to block 362, RFID tag 120 receives wave 112 and processes it, to extract data and so on. Meanwhile, according to block 372, RFID tag 120 does not backscatter with its antenna, and according to block 382, RFID reader 110 has no wave to receive from RFID tag 120.

During interval 326, RFID tag 120 talks to RFID reader 110 as follows. According to block 356, RFID reader 110 transmits a Continuous Wave (CW), which can be thought of as a carrier signal that ideally encodes no information. As discussed before, this carrier signal serves both to be harvested by RFID tag 120 for its own internal power needs, and also as a wave that RFID tag 120 can backscatter. Indeed, during interval 326, according to block 366, RFID tag 120 does not receive a signal for processing. Instead, according to block 376, RFID tag 120 modulates the CW emitted according to block 356, so as to generate backscatter wave 126. Concurrently, according to block 386, RFID reader 110 receives backscatter wave 126 and processes it.

An order, a timing, and other parameters of RFID tag/reader communications may be defined by industry and/or government protocols (also known as standards). For example, the Class-1 Generation-2 UHF RFID Protocol for Communications at 860 MHz-960 MHz ("Gen2 Specification") by EPCglobal, Inc. is one such industry standard. The contents of the Gen2 Specification version 1.2.0 are hereby incorporated by reference.

Figure 4:
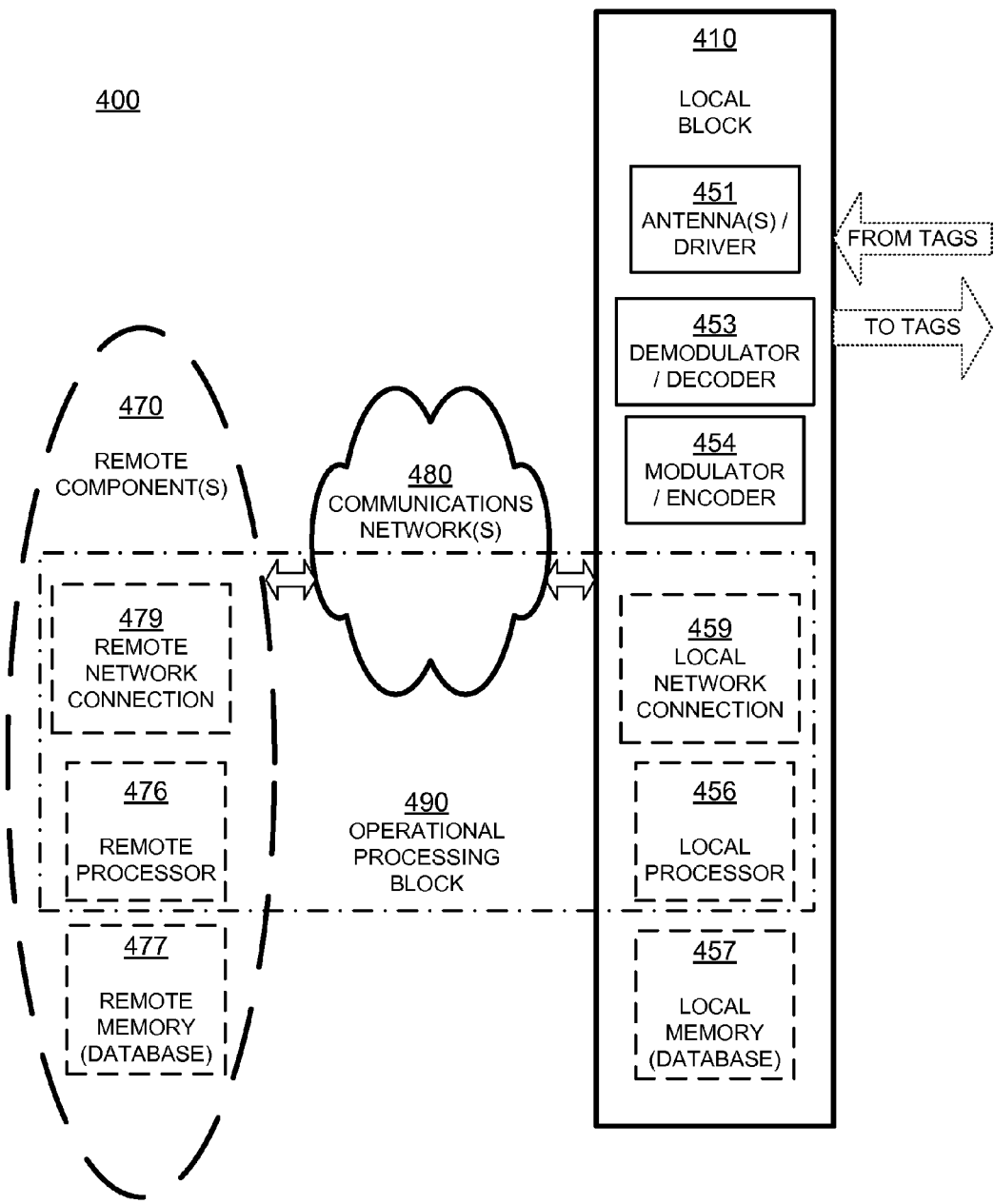
FIG. 4 is a block diagram showing a detail of an RFID reader system.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

Local block 410 is responsible for communicating with the tags. Local block 410 includes a block 451 of an antenna and its driver. Some readers, like that shown in local block 410, contain a single antenna and driver. Some readers contain multiple antennas and/or drivers and a method to switch signals among them, including sometimes using different antennas for transmitting and for receiving. Some readers contain multiple antennas and drivers that operate simultaneously. A demodulator/decoder block 453 demodulates and decodes waves received from the tags via antenna/driver block 451. Modulator/encoder block 454 encodes and modulates an RF wave to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authorization function; in some cases one or more of these functions can be distributed among other blocks such as encoding block 454, or may be entirely incorporated in another block.

Local block 410 additionally includes an optional local memory 457. Local memory 457 may be implemented in any number of ways known in the art. Such ways include, by way of examples and not of limitation, nonvolatile memories (NVM), read-only memories (ROM), random access memories (RAM), any combination of one or more of these, and so on. These memories can be implemented separately from local processor 456, or in an IC with local processor 456, with or without other components. Local memory 457, if provided, can store programs for local processor 456 to run.

In some embodiments, local memory 457 stores data read from tags, or data to be written to tags, such as Electronic Product Codes (EPCs), Tag Identifiers (TIDs) and other data. Local memory 457 can also include reference data that is to be compared to the EPC or TID codes, instructions and/or rules for how to encode commands for the tags, modes for controlling antenna 451, secret keys, key pairs, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are provided, they are coupled to local block 410 via an electronic communications network 480. Network 480 can be a Local Area Network (LAN), a Metropolitan Area Network (MAN), a Wide Area Network (WAN), a network of networks such as the internet, or a mere local communication link, such as a USB, PCI, and so on. In turn, local block 410 then includes a local network connection 459 for communicating with communications network 480. Communications on the network can be secure, such as if they are encrypted or physically protected, or insecure if they are not encrypted or otherwise protected.

There can be one or more remote component(s) 470. If more than one, they can be located at the same location or in different locations. They can communicate with each other and with local block 410 via communications network 480, or via other similar networks, using remote network connection(s) 479. Only one such connection 479 is shown, which is similar to local network connection 459.

Remote component(s) 470 can also include a remote processor 476. Remote processor 476 can be made in any way known in the art, such as was described with reference to local processor 456. Remote processor 476 may also implement an encryption function, similar to local processor 456.

Remote component(s) 470 can also include a remote memory 477. Remote memory 477 can be made in any way known in the art, such as was described with reference to local memory 457. Remote memory 477 may include a local database or a different database of a standards organization, such as one that can reference EPCs. Remote memory 477 may also contain information associated with commands, tag profiles, secret keys, or the like, similar to local memory 457.

Of the above-described elements, it may be advantageous to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna 451, and cause antenna 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing operational processing block 490.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
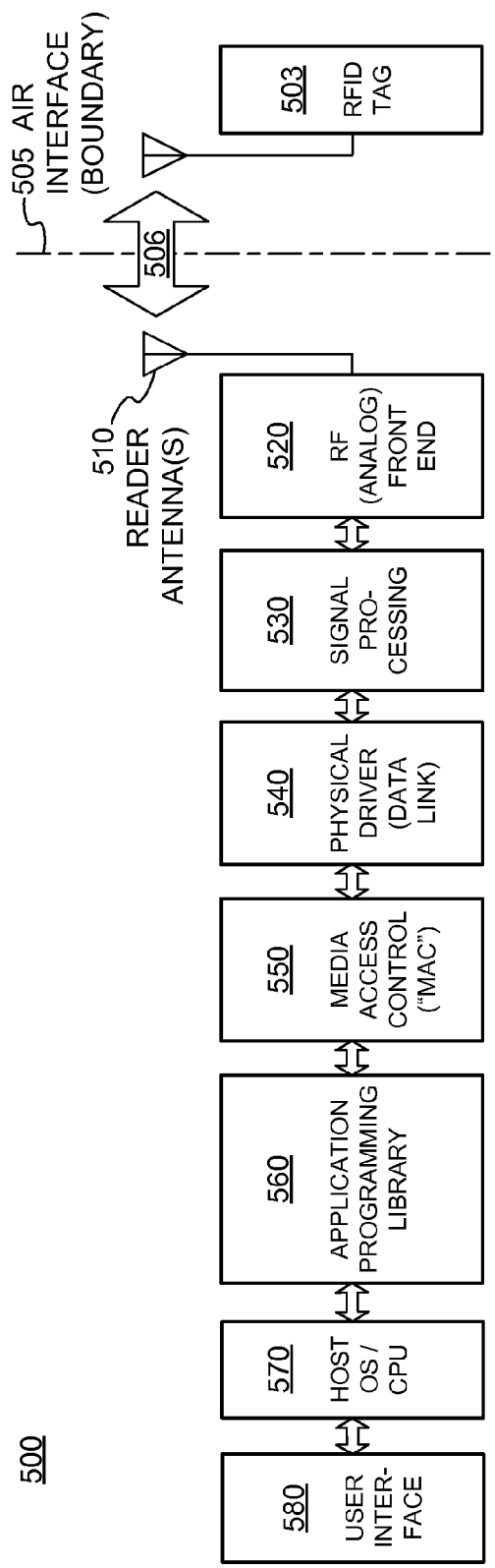
FIG. 5 is a block diagram illustrating an overall architecture of an RFID system according to embodiments.

FIG. 5 is a block diagram illustrating an overall architecture of an RFID system 500 according to embodiments. It will be appreciated that RFID system 500 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 503 is considered here as a module by itself and not part of the reader. RFID tag 503 conducts a wireless communication 506 with the remainder via air interface 505. It is noteworthy that air interface 505 is really only a boundary, in that signals or data that pass through it are not intended to be transformed from one thing to another. Protocols as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 also includes a physical-driver module 540, which is also known as a data-link module. In some embodiments physical-driver module 540 exchanges data with signal-processing module 530. Physical-driver module 540 can be the stage associated with the framing of data.

RFID system 500 additionally includes a media access control module 550, which is also known as MAC layer module. In one embodiment, MAC layer module 550 exchanges data packets with physical driver module 540. MAC layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with retrieving identification data from a tag, challenging the tag, and verifying the tag through interaction with a verification authority and/or a certification authority. In some embodiments the one or more processors may verify an electronic signature, create a tag challenge, and verify a tag response.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for transmitting RFID waveforms and in the other direction for receiving RFID waveforms. In transmitting mode, waveform initiation can be in any one of the modules. Ultimately, signals are routed to reader antenna(s) 510 to be transmitted as wireless waves. In receiving mode, reader antenna(s) 510 receives wireless waves, which are in turn processed successively by the various modules in the chain. Processing can terminate in any one of the modules.

The architecture of RFID system 500 is presented for purposes of explanation, and not of limitation. Its particular, subdivision into modules need not be followed for creating embodiments. Furthermore, the features of the present disclosure can be performed either within a single one of the modules, or by a combination of them.

As mentioned previously, embodiments are directed to a Radio-Frequency Identification (RFID) system endorsing an RFID tag. Embodiments additionally include programs, and methods of operation of the programs. A program is generally defined as a group of steps or operations leading to a desired result, due to the nature of the elements in the steps and their sequence. A program is often implemented as a sequence of steps or operations for a processor.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to embodiments. A storage medium according to embodiments is a computer-readable medium, such as a memory, and is read by a processor of the type mentioned above. If a memory, it can be implemented in a number of ways, such as Read Only Memory (ROM), Random Access Memory (RAM), Flash memory, EPROM memory, EEPROM memory, and many others as will be known to those skilled in the art.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet. Often, for the sake of convenience only, it is desirable to implement and describe a program as software. The software can be unitary, or thought of in terms of various interconnected distinct software modules.

Figure 6:
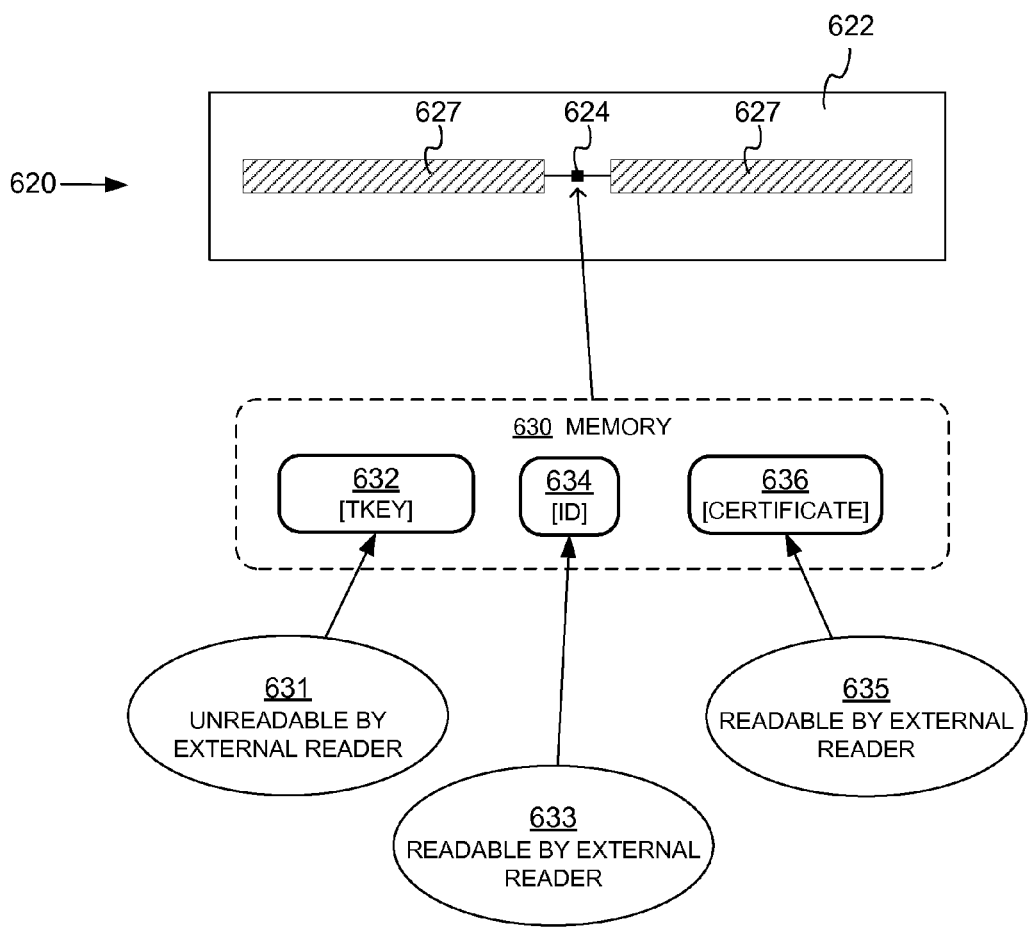
FIG. 6 illustrates an RFID tag configured to store an identifier, certificate or certificates, and one or more keys according to embodiments.

FIG. 6 illustrates a tag 620 configured to store a tag key (TKEY) 632, an identifier (ID) 634, and a certificate 636 according to embodiments. Tag 620, similar to tag 220 depicted in FIG. 2, includes an IC 624 (similar to IC 224 in FIG. 2) with a tag memory 630 configured to store the tag key 632, the ID 634, and the certificate 636, and may also be configured to store any other suitable data. Tag key 632, which is used for cryptographic operations by tag 620, is stored in a portion 631 of the tag memory 630 that is not readable by an external device such as a reader. In some embodiments, each individual RFID tag or group of tags may store a unique tag key.

In contrast, the ID 634, which may identify the tag, an item to which the tag is attached, or both, is stored in a portion 633 of tag memory 630 that is readable by an external device. For example, the ID 634 may include a tag identifier (TID), a key identifier (KID), a unique item identifier (UII), an electronic product code (EPC), a serialized trade identification number (SGTIN), or any other suitable identifier or identification code.

Similarly, certificate 636 is stored in a portion 635 of tag memory 630 that is readable by an external device. Certificate 636 embodies one or more assertions that the tag and/or its attached product possess one or more properties. For example, the certificate 636 may indicate a make/model, a country of origin, size, weight, region of sale, whether the product is hazardous, whether it has been approved by one or more entities (nongovernmental organizations (NGOs), governments, laboratories, or any other suitable organization), whether it contains allergens, whether it meets safety standards, customer satisfaction ratings associated with the product, whether it meets all relevant IP licensure requirements, or other similar properties.

The certificate 636 may also indicate properties about the production of the tag/product. For example, the certificate 636 may indicate labor or farming practices associated with production (e.g., no child labor used, free-range/organic, fair trade, etc.) or energy used during production.

Figure 7:
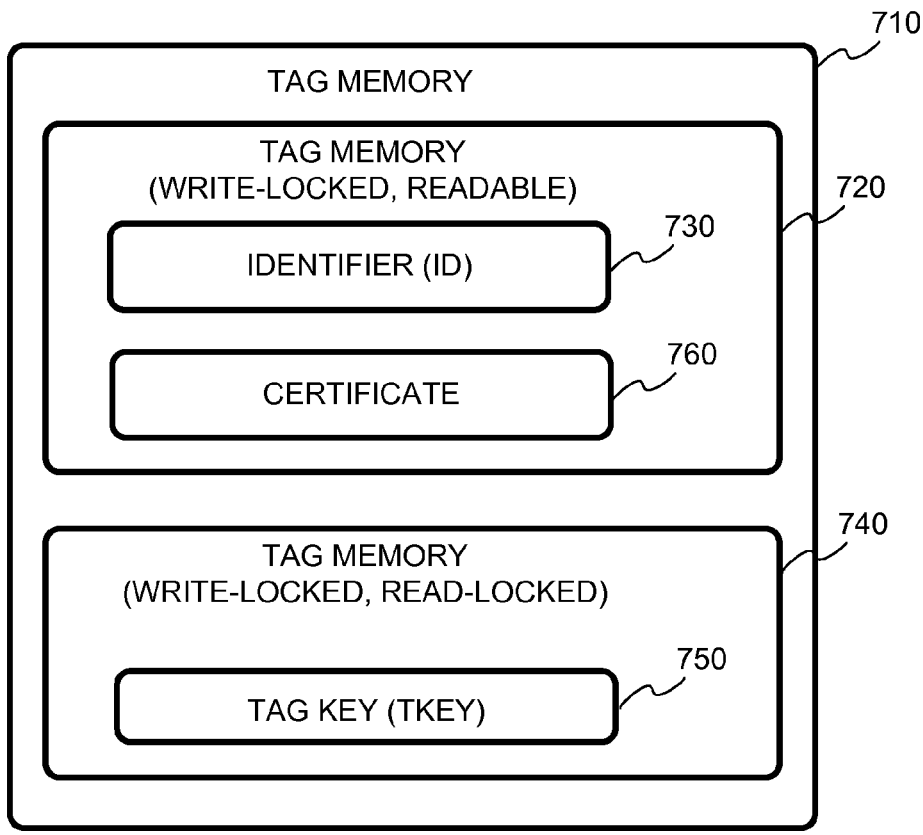
FIG. 7 illustrates a tag memory configuration according to one embodiment.

FIG. 7 depicts the configuration of a tag memory 710 according to one embodiment. Tag memory 710 is similar to tag memory 630 (FIG. 6), and includes at least two tag memory portions 720 and 740. Whereas in some embodiments the tag memory portions 720 and 740 may be portions of a single memory bank or physical memory, in other embodiments the portions 720 and 740 may each comprise separate memory banks, multiple memory banks, or multiple physical memories.

Tag memory portion 720, as with memory portion 633 (FIG. 6), is configured to store ID 730 (similar to ID 634 in FIG. 6) and certificate 760 (similar to certificate 636 in FIG. 6) and be readable by an external device such as a reader. Tag memory portion 720 can be further configured to be unwriteable ("write-locked"), such that an external device cannot write to it, thereby preventing damage to or loss of the ID 730 and/or the certificate 760.

Tag memory portion 740 is similar to memory portion 631 (FIG. 6) in that it is configured to store TKEY 750 (similar to TKEY 632 in FIG. 6) and usually is unreadable by an external device. As with tag memory portion 720, tag memory portion 740 can also be configured to be unwriteable, thereby preventing damage to or loss of the TKEY 750. In some embodiments ID 730, certificate 760, and/or TKEY 750 may be encrypted.

At some point in time, ID 730 and certificate 760 were written into tag memory portion 720, and TKEY 750 was written into tag memory portion 740. For example, a tag manufacturer may generate ID 730 and write it into tag memory portion 720 when the tag was manufactured or soon afterward. Similarly, the tag manufacturer may write the TKEY 750 into tag memory portion 740, either at the same time as ID 730 or at some other time. The certificate 760 may also be written by the tag manufacturer in the same way, although in some embodiments the certificate 760 is written by the product manufacturer/retailer at a later time. Alternatively, the tag supplier, verification/certification authority, or even another entity can perform the writing. Although tag memory portions 720 and 740 are shown as unwriteable ("write-locked") in FIG. 7, the tag manufacturer, product manufacturer/retailer, or other entity may write the ID 730, certificate 760, and/or the TKEY 750 before rendering the tag memory portions unwriteable, or may write the data in some other way (e.g., via direct physical access to the memory portions).

In some embodiments, a reader may be able to reconfigure the tag in order to replace the ID 730, the certificate 760, and/or TKEY 750 written in tag memory portions 720 and 740 with a different ID, certificate, or TKEY. For example, the tag memory portions 720/740 may be configured to be unwriteable by readers without proper authorization but writeable by readers having proper authorization. Thus, an authorized reader may be able to write a new ID, certificate, and/or TKEY into the tag memory portions 720/740.

Figure 8:
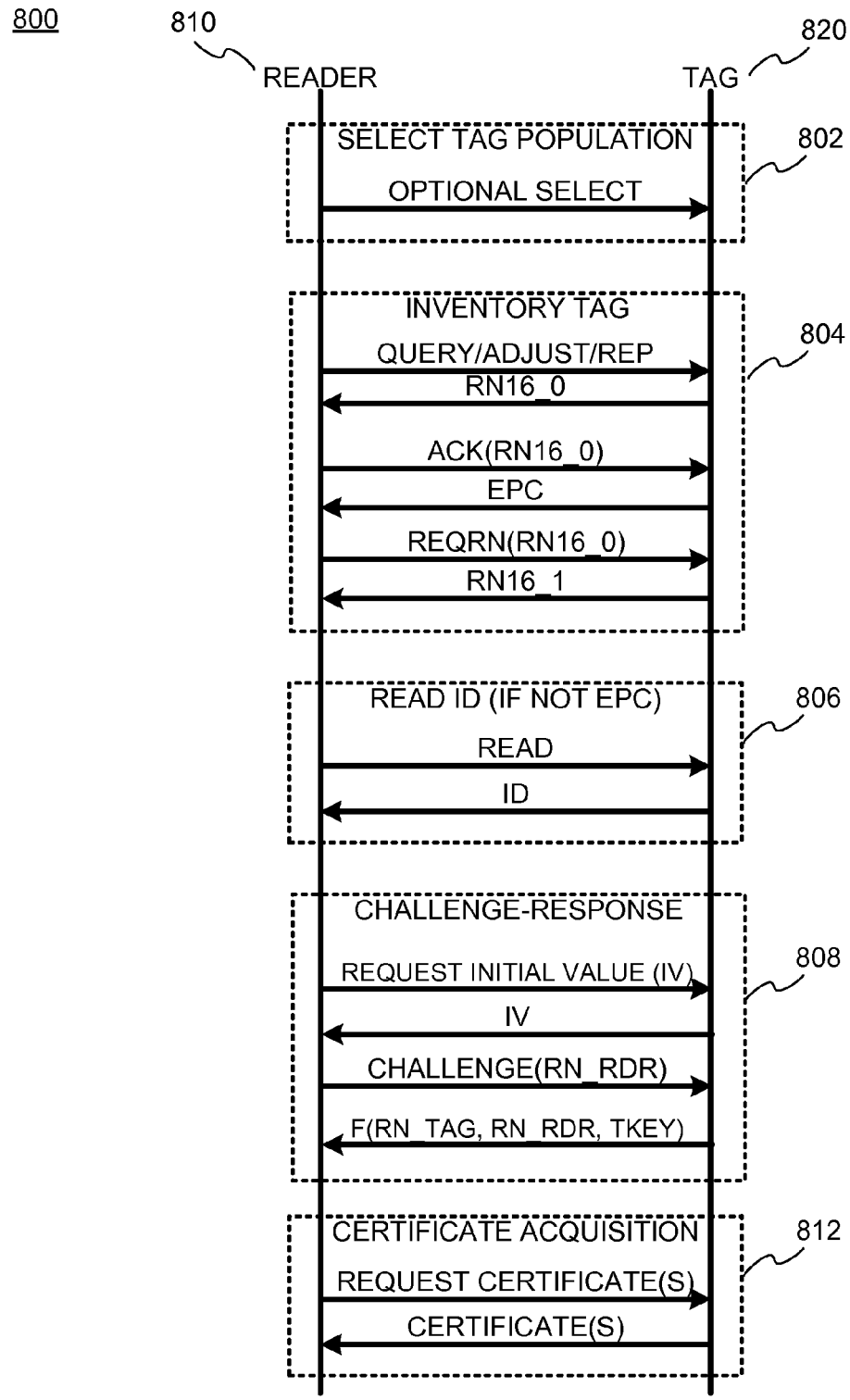
FIG. 8 illustrates a sequence of communications signals between a reader and a tag according to embodiments.

FIG. 8 depicts a sequence 800 of communications signals between a reader 810 and a tag 820 according to one embodiment. The sequence of signals proceeds downward chronologically (i.e., lower signals occur later), with signals from the reader to the tag indicated by arrows pointing right and signals from the tag to the reader indicated by arrows pointing left.

The command and response signals in sequence 800 assume that the reader 810 and tag 820 are using the Gen2 Specification communication protocol. However, any suitable protocol or command sequence may be used. The particular order of the signals in sequence 800 may vary, and the signals and reader/tag operations may be performed in different orders, merged, enhanced, eliminated, and/or spread across other signals/operations.

The sequence 800 begins with an optional tag selection 802, where reader 810 selects one or more tags from a tag population for inventorying and/or authentication. For example, the reader 810 may broadcast a select command to the tag population, and tags in the population that meet one or more criteria in the select command may be selected.

The reader 810 then performs an inventory 804 to singulate an individual tag from the tag population (or from within a group of selected tags, if the reader performed optional tag selection 802). In some embodiments, the reader performs the inventory 804 according to the Query-ACK sequence described in the Gen2 Specification. In the Gen2 Specification Query-ACK sequence, the reader first transmits a Query/QueryAdj/QueryRep command. A tag that meets the criteria for responding may then reply with a 16-bit random/pseudo-random number RN16_0. Upon receipt of the RN16_0, the reader transmits an Acknowledge command with the RN16_0 to the tag, which may then respond with its EPC. The reader then transmits a REQ_RN command with the RN16_0, which requests a new RN16 from the tag for use as a tag handle. The tag then responds with a RN16_1 handle.

After performing the inventory 804, the reader then performs a read 806 in order to access and read the ID (e.g., ID 634/730 in FIGS. 6/7) stored on the tag (if the ID is not the EPC which the tag had previously transmitted in inventory 804). Upon receiving the read command sent by the reader, the tag transmits its stored ID to the reader.

Upon reading the tag ID in read 806, the reader then challenges the tag in a challenge-response step 808. In the challenge-response step 808, the reader may first request an initial value (IV) from the tag. The IV may be generated by the tag based on a tag random number and represents tag-generated randomness used to enhance the security of the challenge-response step 808. The tag random number used to generated the IV may have been previously stored in the tag, be generated in situ, or be generated in situ and then stored in the tag. In some embodiments, the IV may also be generated based on the tag's stored key.

After generating the IV, the tag may transmit the IV to the reader. In some embodiments, the tag may encrypt the IV before transmission. When the reader receives the IV, it transmits a challenge with a reader random number (which may be encrypted) to the tag. In some embodiments, the challenge is generated based on the reader random number and the IV/tag random number. Since the tag already knows the tag random number, in some embodiments the reader may not send the tag random number to the tag in the challenge. However, in other embodiments the reader may send the tag random number to the tag in the challenge. Using a cryptographic algorithm, the tag then generates and transmits a response to the reader based on the received reader random number, the tag random number, and a stored TKEY (e.g., TKEY 632/750 in FIGS. 6/7).

Subsequently, in certificate acquisition step 812, reader 810 requests and receives one or more certificates from tag 820. In some embodiments, the tag 820 may not store certificates, and the reader 810 may use the tag ID received in step 806 (or previously, if the tag ID is the tag EPC) to construct the certificate(s), as described below with respect to FIG. 9.

As mentioned above, the commands and signals in sequence 800 do not have to be performed in the particular order shown, or even grouped as shown. The commands and signals may be separated, combined, or interspersed among each other. For example, an interrogated tag may transmit its tag ID with its response to a reader challenge, instead of providing the ID in read 806. The tag may transmit its tag ID along with its response as consecutive messages, or may concatenate the response with the tag ID, for example by prepending the response with the tag ID, appending the tag ID to the tag response, or otherwise combining the tag ID and the response in the same message. Similarly, the certificate may be concatenated with the ID, or the certificate may be concatenated with the response, or the certificate, ID, and response may all be concatenated together. In some embodiments, the concatenation may occur in the context of a "Gush" command as described in commonly-assigned U.S. patent application Ser. No. 13/423,256, filed on Mar. 18, 2012 and entitled "RFID TAGS THAT BACKSCATTER MORE CODES", hereby incorporated by reference in its entirety. As another example, the commands and signals in the challenge-response step 808 may be separated and interspersed or combined with other commands and signals. For instance, the reader may transmit the initial request for the IV during the optional tag selection 802. Since the select signal in the tag selection 802 is broadcast to a population of tags, multiple tags may receive the reader's IV request. In response, each tag that receives the IV request may generate its own IV and then store the IV in tag memory. The reader may then subsequently read each tag (e.g., in read 806) to retrieve the stored IV.

In some embodiments, the reader may also broadcast the challenge with the reader random number before the IV request or along with the IV request. Each tag that receives the challenge may generate or compute its own response based on the received reader random number, its stored TKEY, and its generated IV (or the tag random number associated with the IV). At least one of the tags may then store its IV and its computed response in tag memory, and the reader may then subsequently read the tag memory (e.g., in read 806) or the tag may transmit its memory contents during identification (e.g. in inventory 804) to retrieve the IV and computed response.

In some embodiments, sequence 800 may not include an explicit challenge-response step 808, because its constituent commands have been interspersed among the other commands in the sequence. A reader may choose to broadcast the IV request and/or the challenge to multiple tags in the optional select 802 in order to allow all of the tags that hear the broadcast to simultaneously generate their IV and compute their responses. In contrast to the challenge-response step 808, where each tag generates its IV and challenge-response serially (i.e., one tag after another), enabling multiple tags to perform these operations in parallel is faster. Due to the time-intensive nature of the cryptographic computations involved in generating IVs or challenge/responses, the time saved by allowing tags to compute in parallel instead of serially can be substantial.

While the particular challenge-response step 808 shown in sequence 800 includes an IV, other challenge-response steps may be used that do not include an IV. In some embodiments, a challenge-response may include a command count (e.g., a count from the reader indicating the number of commands it has transmitted or a count from the tag indicating the number of commands it has received) and/or a message authentication code (e.g., an electronic signature). Other challenge-responses may include more or fewer steps than the particular challenge response 808 shown in sequence 800.

In some embodiments, the reader may interact with a verification authority that has some knowledge about the interrogated tag(s) (e.g., the tag key TKEY and/or the encryption algorithm(s) used by the tag(s)). The verification authority may be known to the reader a priori, or the reader may query a network for the identity of an appropriate verification authority. In some embodiments, a tag may store the identity of a verification authority suitable for verification, and the reader may read the verification-authority information from the tag.

After the reader has received a tag response in the challenge-response step 808, the reader may send the tag response, the tag IV (if any), the original reader challenge, and the tag ID (received in read 806) to the verification authority. The verification authority may then determine the TKEY and/or the particular encryption algorithm used by that tag (e.g., by looking it up based on the received ID) and use the determined TKEY/encryption algorithm, along with the original reader challenge and tag IV (if any), to decrypt or verify the tag response. If the verification authority is able to decrypt/verify the tag response based on its knowledge of the tag (e.g., TKEY/encryption algorithm), then the verification authority may confirm the tag response and thereby corroborates the tag's (or attached item's) authenticity.

In some embodiments, the verification authority may generate the challenge and send it to the reader for transmission to the tag. In this case, the reader may not transmit the original reader challenge back to the verification authority along with the tag response, tag IV, and the tag ID, because the verification authority already knows the challenge used. Optionally, the verification authority may generate and provide a random number (e.g., the reader random number or an entirely different random number) for the reader to use to generate the challenge.

In some embodiments, the reader may interact with a certification authority to validate one or more certificates associated with the tag. The reader may interact with the certification authority indirectly (e.g., through the verification authority) or directly. The certification authority may be known to the reader or verification authority a priori, or may be determined via a network query. In some embodiments, a tag may store the identity of a certification authority suitable for certification, and the reader may read the certification information from the tag and use it directly or pass it on to the verification authority.

Figure 9:
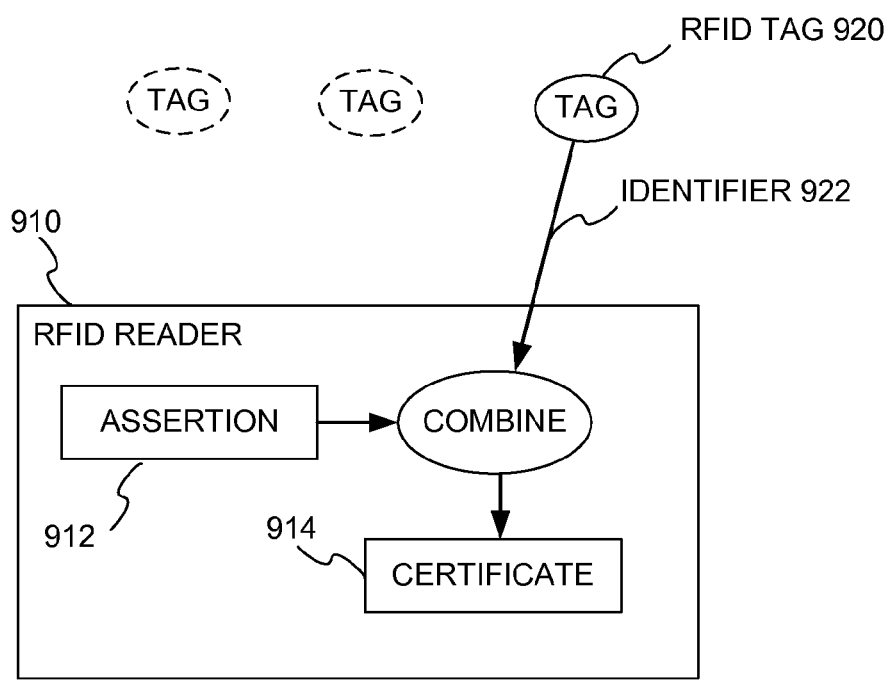
FIG. 9 is a diagram illustrating how a reader may construct a certificate based on an identifier received from a tag according to embodiments.

In some embodiments a reader may receive the certificate(s) from the tag. In other embodiments a reader may construct the certificate(s) using the identifier received from the tag. FIG. 9 depicts a diagram 900 of how a reader may construct a certificate based on a tag identifier according to embodiments.

As shown in diagram 900, a reader 910 may be able to access one or more assertions 912 regarding potential properties of a tag or of the product to which the tag is attached, similar to those that would be embodied in a certificate stored in a tag. When the reader 910 receives an identifier 922 from a tag 920, it may combine the identifier 922 with the one or more assertions 912 to construct a certificate 914. The assertions 912 may be locally-stored on the reader 910 as shown in FIG. 9, may be stored on the product to which the tag is attached, may be stored on a display or sign associated with the product, or may be stored on a remote server accessible to the reader 910 via a network. The assertions may be stored in human-readable form (e.g. a "certified organic" logo), scan-readable form (e.g. 1-D barcode, 2-D barcode, or similar symbology), or machine-readable form (e.g. values stored in a memory or database). These assertions can be any of the product attributes described above that are embodied in certificates, such as organic, vegan, vegetarian, make and model, country of origin, child-free labor, green energy usage, etc.

Figure 10:
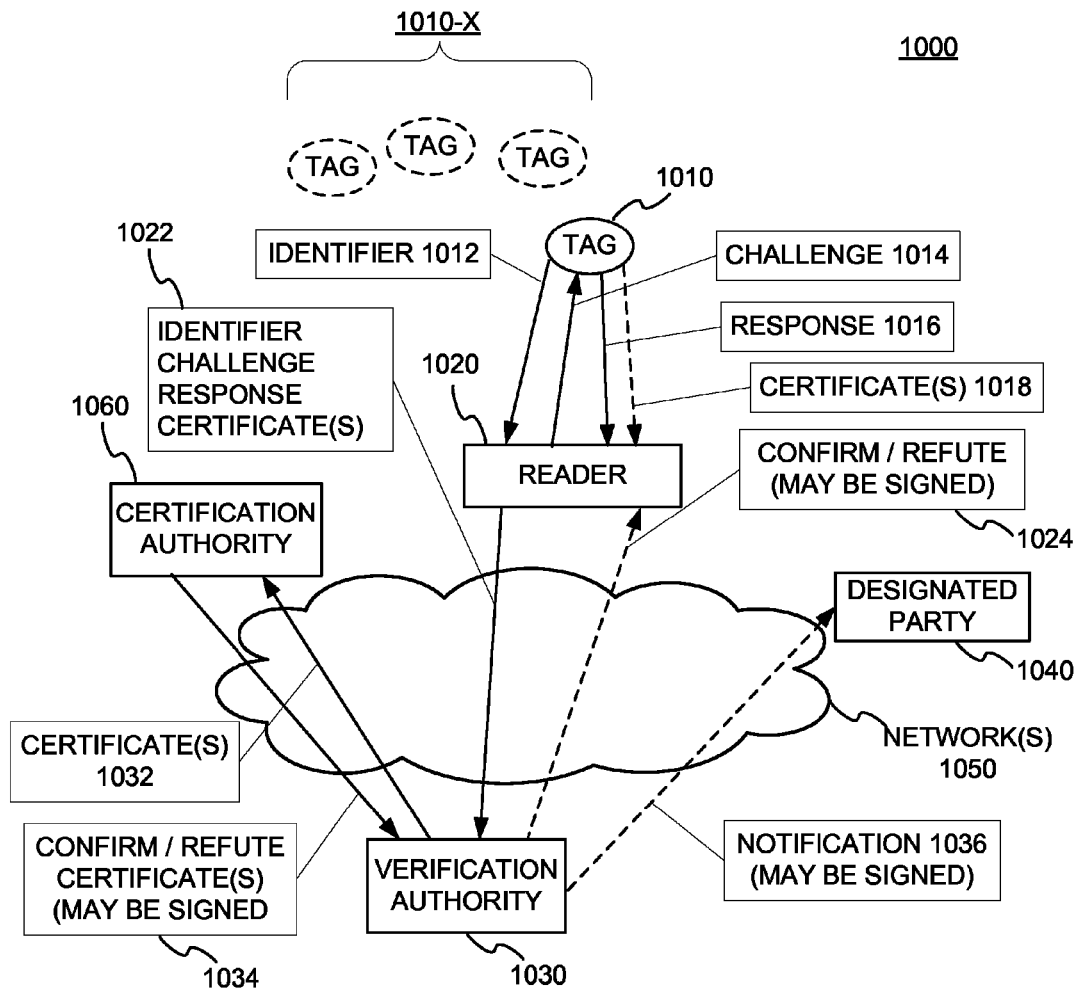
FIG. 10 is a diagram depicting interactions between an RFID reader, RFID tags, a verification authority, a certification authority, and a designated party according to one embodiment.

FIG. 10 is a diagram 1000 depicting interactions between an RFID reader 1020, RFID tags 1010-X and 1010, a verification authority 1030, a certification authority 1060, and a designated party 1040 according to one embodiment.

In diagram 1000, reader 1020 is communicating with a number of tags 1010-X and 1010. In particular, reader 1020 has singulated tag 1010 and receives its identifier 1012 (e.g., an EPC or other identifier such as ID 634/730 in FIGS. 6/7). Reader 1020 then transmits a challenge 1014 (e.g., the challenge in challenge-response step 808, FIG. 8) to the tag 1010. The tag 1010, which stores a secret (e.g., a tag key, such as TKEY 632/750 in FIGS. 6/7), generates a response 1016 (e.g., the F( ) response in challenge-response step 808, FIG. 8) based on its stored secret (and optionally tag-generated randomness). The tag 1010 then transmits its response 1016 to reader 1020.

In some embodiments, the tag 1010 also optionally transmits one or more certificates 1018 to the reader 1020, either because the reader 1020 explicitly requests the certificate(s) or because the tag 1010 is configured to transmit the certificate(s) when responding to reader challenges. In other embodiments, instead of receiving certificates, the reader 1020 constructs one or more certificates based on the identifier 1012 received from the tag 1010, as described above in relation to FIG. 9.

Reader 1020 then transmits (1022) the identifier, the challenge, the response, the certificate(s), and optionally any indicators of tag-generated randomness (e.g., a tag IV) to a verification authority 1030 over one or more networks 1050. The verification authority 1030 stores or has access to information about the tag 1010, such as its secret and/or the encryption algorithm it uses. The verification authority 1030 then uses this information, the received identifier, challenge, and response to determine if the tag is authentic. For example, in one embodiment, the verification authority 1030 may use the received identifier to find and access a local copy of the tag's stored secret/key, compute a response from the secret/key and the received challenge, and compare the computed response with the actual, received tag response. If the two responses match then the tag is authentic, and if the responses do not match then the tag is not authentic. The verification authority 1030 may then optionally send a message 1024 (which may be electronically signed by the verification authority 1030) to the reader 1020 via network(s) 1050 confirming or refuting the authenticity of the tag (or the item it is attached to).

The verification authority 1030 may also transmit (1032) the received certificate(s) and optionally the identifier to a suitable certification authority 1060. The received certificate (s) may identify or indicate one or more suitable certification authorities (e.g., as a name or a URL that identifies the certification authority's internet address), or the verification authority may know suitable certification authorities a priori. The certification authority 1060 then validates properties of the tag and/or attached product based on the received certificate(s) and optionally the identifier. For example, the received certificates may assert certain properties that the tag and/or attached product possess. The certification authority 1060 checks the certificates to make sure that they are valid, implying that the tag and/or product do in fact possess the claimed properties. The certification authority 1060 may check certificate validity by, for example, using the tag identifier as a table lookup for a tag/product's known properties, checking that the received certificate corresponds to a certificate stored at the certification authority, checking an electronic signature attached to the received certificate, or any other way of determining certificate validity.

Upon determining the validity of a received certificate, the certification authority 1060 transmits a message 1034 (which may be electronically signed by the certification authority 1060) confirming or refuting the received certificate to the verification authority 1030, which may then include the certificate confirmation/refutation information in optional message 1024 to reader 1020.

In some applications the certification authority 1060 may pre-register certificates at the verification authority 1030 in advance, so that the verification authority 1030 can act as a proxy for the certification authority and validate or refute a tag's certificates without having to communicate with the certification authority 1060.

In some embodiments, the message 1022 transmitted by the reader 1020 to the verification authority 1030 may include the physical location of the reader when the challenge was issued to the tag 1010. The message 1022 may also include a reader identifier, and/or may be signed with a reader electronic signature.

The verification authority 1030 may also transmit a notification 1036 (which may be electronically signed by the verification authority 1030 and/or by the certification authority 1060) to one or more designated parties 1040 via network(s) 1050. The notification 1036 may indicate whether the authenticity of tag 1010 was confirmed or refuted, and/or whether the one or more certificates associated with tag 1010 were determined to be valid. For example, a pharmaceutical distributor using an RFID-enabled handheld reader to interrogate a shipment (such as a case of medicine) may utilize a verification authority, which may send the reply to a designated party such as the distributor's security office or, in some instances, directly to the police in the event of counterfeit medicine. The same distributor may also utilize a certification authority to ensure that the shipment has valid certificates indicating one or more properties (e.g., has approval from appropriate authorities, meets safety standards, or any other suitable property), and the certification authority may notify a designated party if the shipment's certificates are invalid.

In some embodiments, the verification authority 1030 may transmit an optional message 1030 to the reader 1020 indicating whether the tag 1010 has been authenticated and/or whether a certificate associated with the tag 1010 has been validated. In other embodiments, the verification authority 1030 may only transmit a message if tag authenticity/certificate validity has been confirmed, if tag authenticity/certificate validity has been refuted, or may not transmit a message to the reader 1020 at all. The verification authority 1030 may also transmit a notification to designated parties) 1040 if the authenticity/certificate validity of the tag 1010 has been confirmed or refuted, only if tag authenticity/certificate validity has been confirmed, or only if tag authenticity/certificate validity has been refuted. In some embodiments, the certification authority 1060 may also independently transmit a notification (not shown) to the designated party 1040.

As shown in diagram 1000, the verification authority 1030 communicates with the reader 1020, the certification authority 1060, and the designated party 1040 over one or more networks 1050. The network(s) 1050 may be available in real-time, meaning that an entity can engage with another entity on the network 1050 on a message-by-message basis, or the network(s) 1050 may be non-real-time, meaning that an entity stores or buffers its messages and transmits them to other entities when the network is available. Of course, entities may also store and transmit messages to other entities on a network that is available in real-time.

In one embodiment the reader 1020 may store responses and/or certificates from multiple tags before transmitting one or more of the responses/certificates to the verification authority 1030. In this embodiment, the reader 1020 may configure its transmissions to the verification authority 1030 to take advantage of batch transmission. If the reader 1020 stores responses from multiple tags to a single challenge, the reader 1020 may first transmit a subset (one or more) of the stored responses but only one copy of the challenge to the verification authority 1030. Subsequently, the reader 1020 may transmit more of the stored responses, but no further challenges, to the verification authority 1030. Similarly, if the reader 1020 stores certificates from multiple tags, it may transmit a subset (one or more) of the stored certificates in one transmission and another subset of the stored certificates in another transmission. In some embodiments, a particular stored certificate may embody assertions about more than one tag. In these embodiments, the reader 1020 may only transmit a single copy of the certificate for multiple tags, instead of transmitting a copy of the certificate for each tag.

Figure 11:
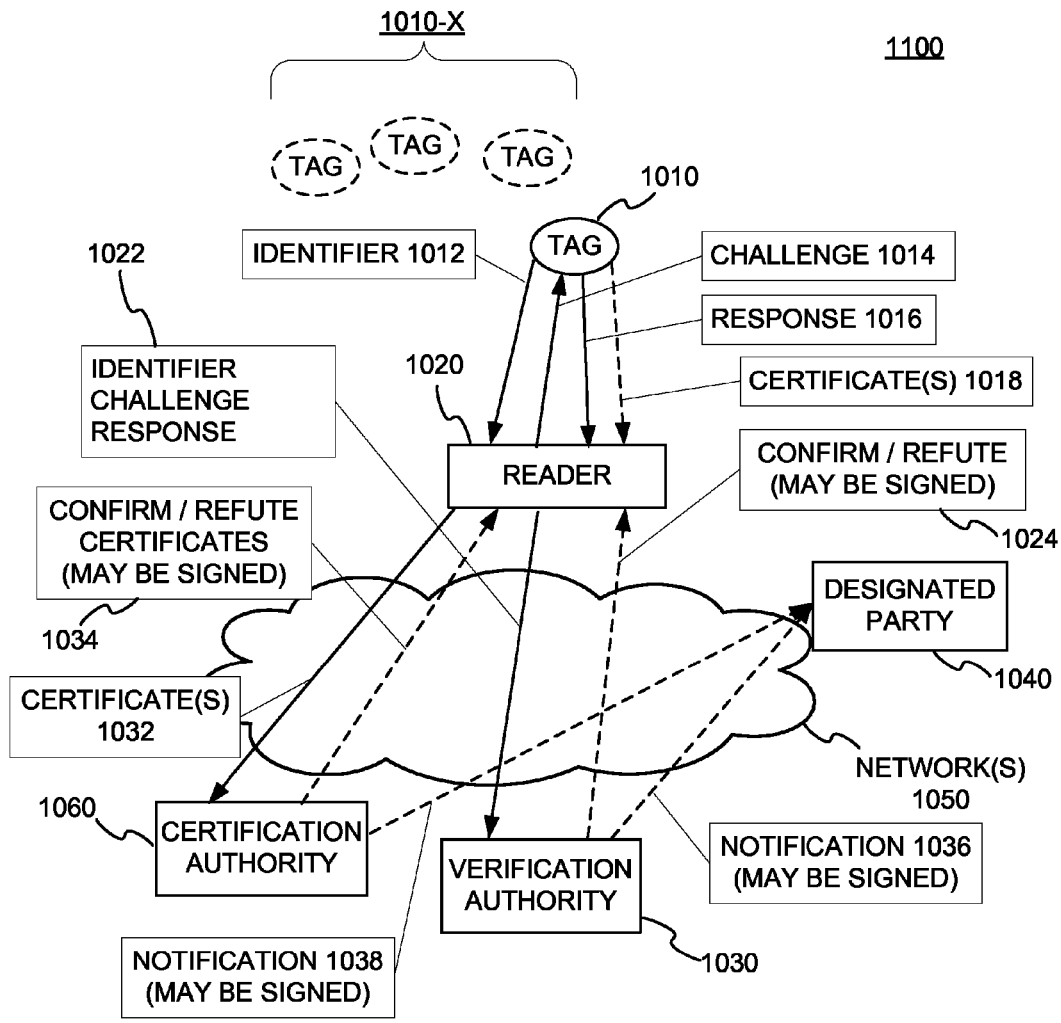
FIG. 11 is a diagram depicting interactions between an RFID reader, RFID tags, a verification authority, a certification authority, and a designated party according to another embodiment.

FIG. 11 is a diagram 1100 similar to diagram 1000 in FIG. 10, with like-numbered elements corresponding to each other. In contrast to FIG. 10, in FIG. 11 reader 1020 interacts directly with the certification authority 1060 instead of through verification authority 1030. In these embodiments, the reader 1020 transmits (1032) certificates (and optionally a tag identifier such as identifier 1012) to the certification authority 1060, and does not transmit certificates to the verification authority 1030 in message 1022. The certification authority 1060 determines the validity of the certificates as described above in relation to FIG. 10, and may transmit an optional message 1034 back to the reader 1020 confirming or refuting the validity of the certificates. In some embodiments, the certification authority 1060 may also transmit a notification 1038 (which may be signed) to designated party 1040.

As mentioned above, a certificate embodies assertion(s) that a tag and/or its attached product possess certain properties (or that the production process of the tag/product possessed certain properties). The certificate may also include the name, location, and or means of contacting a certification authority that can confirm or refute the assertions. In some embodiments, a response from a certification authority has to be confirmed to be genuine (i.e., is actually from the correct certification authority and has not been forged or altered). In these embodiments, the certification authority may electronically sign any message it transmits, via a symmetric or asymmetric cryptographic algorithm, and the entity receiving the message may verify the signed reply using the appropriate cryptographic algorithm.

In some embodiments, the verification authority and the certification authority may be the same entity, or the verification authority may act as a proxy for the certification authority (as described above in relation to FIG. 10). The reader may transmit tag identifiers/challenges/responses and tag certificates in different messages (e.g., messages 1022 and 1032 in FIG. 11), or may combine them in a single message (e.g., message 1022 in FIG. 11). Similarly, the verification authority/certification authority may transmit tag/certificate confirmation/refutation messages individually (e.g., messages 1024 and 1034 in FIG. 11) or as a single message (e.g., message 1024 in FIG. 10). In some embodiments, the reader may transmit a reader certificate to the verification authority and/or the certification authority, where the reader certificate may embody one or more assertions about the reader. For example, the reader certificate may indicate the authenticity or physical location of the reader.

Figure 12:
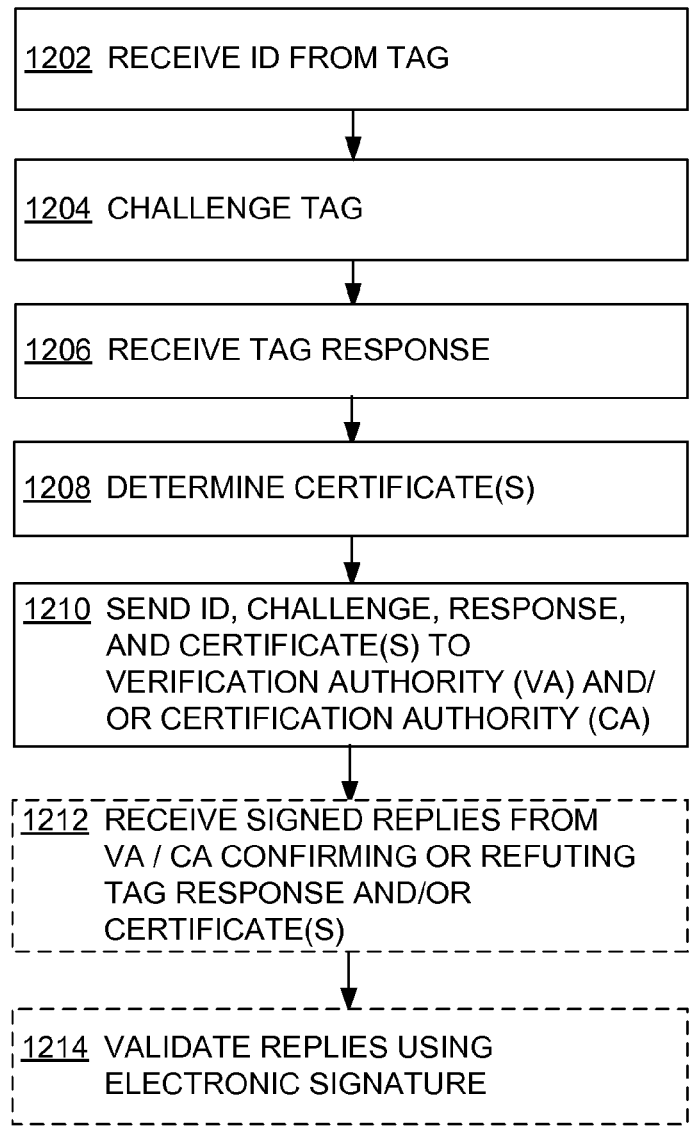
FIG. 12 is a flowchart illustrating a process for a reader authenticating a tag and validating a certificate according to embodiments.

FIG. 12 is a flowchart illustrating a process 1200 for a reader authenticating a tag and validating a certificate according to embodiments.

Process 1200 begins with step 1202, where the reader (e.g., reader 810/1020 in FIGS. 8/10) receives an identifier (e.g., identifier 1012 in FIG. 10) from a tag (e.g., tag 1010 in FIG. 10). Upon receiving the identifier, the reader challenges the tag at step 1204 (e.g., by transmitting challenge 1014 in FIG. 10) and receives a response to the challenge from the tag (e.g., response 1016 in FIG. 10) at step 1206.

At step 1208, the reader then determines one or more certificates associated with the tag. For example, the reader may receive the certificate(s) from the tag (e.g., certificate(s) 1018 in FIG. 10), or may construct the certificate(s) based on the received identifier (e.g., as described above in relation to FIG. 9). Subsequently, the reader sends the received identifier, the challenge, the tag's response to the challenge, and the determined certificate(s) to a verification authority (e.g., verification authority 1030 in FIG. 10) and/or to a certification authority (e.g., certification authority 1060 in FIG. 11) at step 1210. The reader may then receive electronically-signed replies from the verification and/or certification authority at optional step 1212 confirming or refuting the tag response and/or the validity of the certificate(s). At optional step 1214, the reader may validate the received replies by checking their electronic signatures.

The steps described in process 1200 are for illustrative purposes only. Network-enabled RFID tag endorsement may be implemented using additional or fewer steps and in different orders using the principles described herein.

Figure 13:
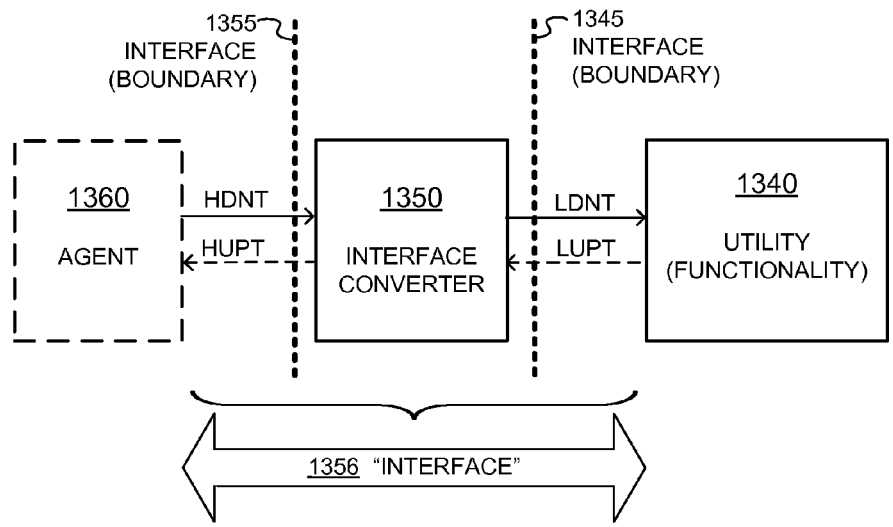
FIG. 13 is a block diagram illustrating an interface-converter architecture according to embodiments.

FIG. 13 is a block diagram illustrating an architecture 1300 for an interface converter according to embodiments. Architecture 1300 includes a utility 1340, which is a mechanism for performing some or all of the reader features described above.

More particularly, utility 1340 may cause a reader to endorse an RFID tag. Endorsement includes but is not limited to both authenticating the RFID tag to determine the legitimacy of the tag and/or the object to which the tag is attached, and validating one or more certificates that embody assertions that the tag and/or the object to which the tag is attached possess one or more properties.

Architecture 1300 additionally includes an interface converter 1350 and an agent 1360. Embodiments also include methods of operation of interface converter 1350. Interface converter 1350 enables agent 1360 to control utility 1340. Interface converter 1350 is so named because it performs a conversion or a change, as will be described in more detail below. Agent 1360, interface converter 1350, and utility 1340 can be implemented in any way known in the art. For example, each can be implemented in hardware, middleware, firmware, software, or any combination thereof. In some embodiments, agent 1360 is a human.

Between interface converter 1350, agent 1360 and utility 1340 there are respective boundaries 1345 and 1355. Boundaries 1345 and 1355 are properly called interfaces, in that they are pure boundaries, as is the air interface described above in relation to FIG. 5.

In addition, it is a sometimes informal usage to call the space between boundaries 1345 and 1355, which includes interface converter 1350, an "interface" 1356. Further, it is common to designate this space with a double arrow as shown, with an understanding that operations take place within the arrow. So, although "interface" 1356 is located at a boundary between agent 1360 and utility 1340, it is not itself a pure boundary. Regardless, the usage of "interface" 1356 is so common for interface converter 1350 that this document sometimes also refers to it as an interface. It is clear that embodiments of such an "interface" 1356 can be included in this invention, if they include an interface converter that converts or alters one type of transmission or data to another, as will be seen below.

Agent 1360 can be one or more architecture layers. For example, agent 1360 can be something which a programmer may program. In alternative embodiments, where agent 1360 is a human, interface converter 1350 can include a screen, a keyboard, etc. An example is now described.

Figure 14:
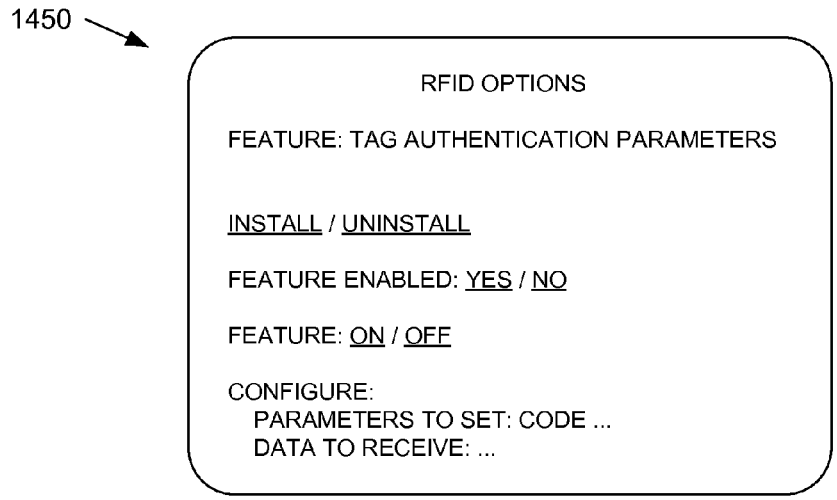
FIG. 14 is a sample screenshot of an interface converter such as the interface converter of FIG. 13, according to an embodiment.

FIG. 14 is a sample screenshot 1450 of an interface converter, such as the interface converter of FIG. 13. Screenshot 1450 can be that of a computer screen for a human agent, according to an embodiment. What is displayed in screenshot 1450 exposes the functionality of a utility, such as utility 1340. Inputs by the user via a keyboard, a mouse, or any suitable user input device can ultimately control utility 1340. Accordingly, such inputs are received in the context of screenshot 1450. These inputs are determined from what is needed for controlling and operating utility 1340. An advantage with such interfacing is that agent 1360 can interact with RFID applications at a higher level, without needing to know how to control lower level RFID operations. Such lower level RFID operations can be as described in the Gen2 Specification, in cryptographic algorithms, in other lower level protocols, etc. Utility 1340 can be controlled in any number of ways, some of which are now described.

Returning to FIG. 13, one way interface converter 1350 can be implemented is as a software Application Programming Interface (API). This API may control or provide inputs to an underlying software library.

Communications can be made between agent 1360, interface converter 1350, and utility 1340. Such communications can be as input or can be converted, using appropriate protocols, etc. These communications may encode commands, data, or any other suitable signal(s). In some embodiments, these communications can include one or more of the following: a high-down communication HDNT from agent 1360 to interface converter 1350; a low-down communication LDNT from interface converter 1350 to utility 1340; a low-up communication LUPT from utility 1340 to interface converter 1350; and a high-up communication HUPT from interface converter 1350 to agent 1360. These communications can be spontaneous, or in response to another communication, in response to an input or an interrupt, or in response to any suitable signal or condition.

In certain embodiments, communications HDNT and LDNT include commands for ultimately controlling utility 1340. These commands may control utility 1340 in any number of ways. For example, one or more commands may install utility 1340 or just a feature of it. The installation may be performed by spawning, downloading, or any other suitable installation method. Other ways in which commands may be used to control utility 1340 include configuring, enabling, disabling, or operating utility 1340, or just a feature of it. These commands can be standalone, or can carry parameters, such as data, instructions to be stored by tags, etc. In some embodiments interface converter 1350 can convert these commands to a format suitable for utility 1340.

In some embodiments, communications HUPT and LUPT include data. The data may indicate the success or failure of executing an operation. The data can also include tag data, which can be both codes read from tags and data about reading tags (such as time stamps, date stamps, RSSI, IVs, responses, etc.). In some embodiments interface converter 1350 can convert the data to a format suitable for agent 1360, including in some cases aggregating, filtering, merging, or otherwise altering the format or utility of the data.

It should be noted that what passes across a single pure boundary is unchanged (by the mere definition of a pure boundary). However, signals or communications passing through interface converter 1350 may be changed. More particularly, high-down communication HDNT may have encoding similar to or different from low-down communication LDNT. In addition, low-up communication LUPT may have encoding similar to or different from high-up communication HUPT. If encoding between signals/communications is different, the difference can be attributed to interface converter 1350, which performs a suitable change, or conversion, of one communication to another. The interface converter 1350 may perform changes or conversions in order to expose the functionality of utility 1340 to agent 1360 and vice versa. In some embodiments, a command is converted, but a parameter is passed along without being converted. What is not converted at one module may be converted at another. Such modules taken together can also form an interface converter according to embodiments.

Figure 15:
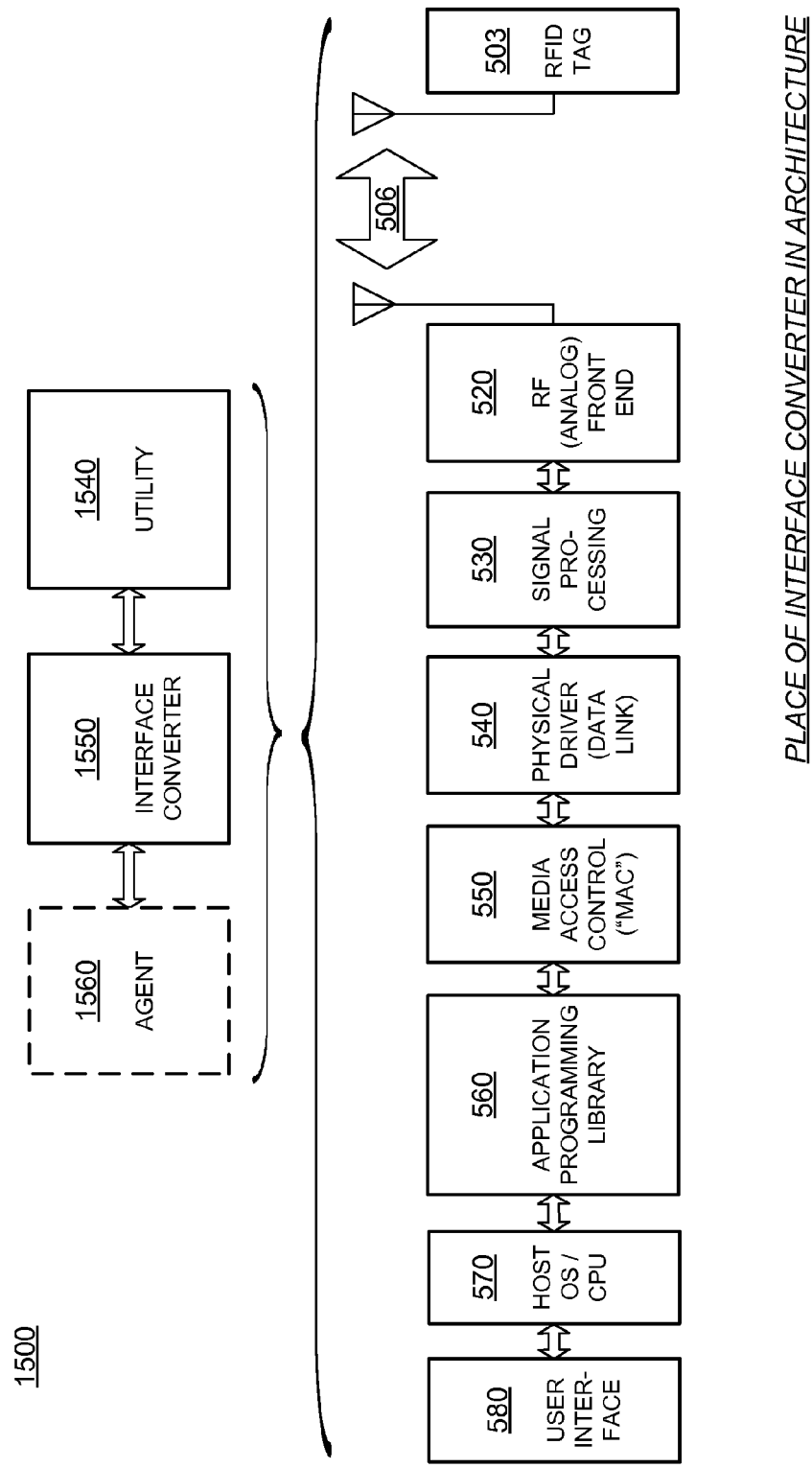
FIG. 15 is a diagram for showing a correspondence for how components of FIG. 13 can be implemented by those of FIG. 5, in embodiments where the interface converter is implemented by a reader.

Agent 1360, interface converter 1350, and utility 1340 can be implemented as part of a reader, or as a different device. In embodiments where the agent 1360, interface converter 1350, and utility 1340 are implemented as part of a reader, FIG. 15 suggests a scheme 1500 where agent 1360, interface converter 1350, and utility 1340 can be implemented in connection with respective reader modules that are suitable, depending on the requirements.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A method for a Radio Frequency Identification (RFID) reader to endorse an RFID tag, the method comprising:
   receiving an identifier from the tag;
   determining a certificate from the tag, wherein the certificate identifies a property of an item to which the tag is affixed, the property including one or more of: a region of sale, whether the item is hazardous, whether the item has been approved by one or more entities, whether the item contains allergens, whether the item meets safety standards, whether the item meets relevant intellectual property (IP) licensure requirements, and customer satisfaction ratings associated with the item;
   challenging the tag with a challenge;
   receiving a response from the tag;
   sending a first message including at least the identifier, challenge, and response to a verification authority;
   sending a second message including at least the identifier and the certificate to a certification authority;
   receiving a first reply from the verification authority; and
   receiving a second reply from the certification authority.

2. The method of claim 1, wherein the identifier is one or more of: a tag identifier (TID), a key identifier (KID), a unique item identifier (UII), an electronic product code (EPC), a serialized trade identification number (SGTIN), and a Universal Resource Identifier (URI).

3. The method of claim 1, wherein the certificate further identifies at least one of:
   a property of the tag and
   the certification authority.

4. The method of claim 1, wherein the certificate is determined by
   constructing the certificate from the identifier and at least one assertion accessible to the reader, wherein the assertion is in at least one of:
   a human-readable form,
   a scan-readable form, and
   a machine-readable form.

5. The method of claim 1, further comprising at least one of:
   storing a plurality of responses from a plurality of tags before sending at least one of the plurality of responses to the verification authority; and
   storing a plurality of certificates from the plurality of tags before sending at least one of the plurality of certificates to the certification authority.

6. The method of claim 1, wherein at least one of the first and second messages further includes at least one of:
   a reader certificate;
   a physical location for the reader; and
   a reader electronic signature.

7. The method of claim 1, wherein at least one of:
   the verification authority and the certification authority are the same entity,
   the first and second messages are combined into a single message, and
   the first and second replies are combined into a single reply.

8. The method of claim 1, wherein at least one of:
   the response is concatenated with the identifier,
   the certificate is concatenated with the identifier, and
   the certificate is concatenated with the response.

9. The method of claim 1, wherein the reader challenges multiple tags with one challenge simultaneously, and at least one of the tags is configured to store its response for a subsequent reading by the reader.

10. A method for a Radio Frequency Identification (RFID) system including a reader, a verification authority, and a certification authority to endorse an RFID tag containing a key, the method comprising:
    the reader:
      receiving an identifier from the tag;
      determining a certificate from the tag;
      challenging the tag with a challenge;
      receiving a response from the tag, wherein at least one of the certificate and the response is concatenated with the identifier;
      sending a first message including the identifier, challenge, and response to a verification authority; and
      sending a second message including at least the identifier and the certificate to a certification authority; and
    at least one of:
      the verification authority sending a first notification to a designated party if the response is incorrect, and
      the certification authority sending a second notification to the designated party if the certificate is not supported.

11. The method of claim 10, further comprising at least one of:
    the reader storing a plurality of responses from a plurality of tags before sending at least one of the plurality of responses to the verification authority; and
    the reader storing a plurality of certificates from the plurality of tags before sending at least one of the plurality of certificates to the certification authority.

12. The method of claim 10, wherein the reader determines the certificate by
    constructing the certificate from the identifier and at least one assertion accessible to the reader, wherein the assertion is in at least one of:
    a human-readable form,
    a scan-readable form, and
    a machine-readable form.

13. The method of claim 10, wherein the verification authority is one of:
    the same as the certification authority; and
    a proxy for the certification authority.

14. The method of claim 10, wherein at least one of:
    the verification authority signs the first notification with a verification authority electronic signature; and
    the certification authority signs the second notification with a certification authority electronic signature.

15. The method of claim 10, wherein the reader challenges multiple tags with one challenge simultaneously, and at least one of the tags is configured to store its response for a subsequent reading by the reader.

16. A Radio Frequency Identification (RFID) reader adapted to endorse an RFID tag, the reader comprising:
- a memory; and
- a processor coupled to the memory, the processor configured to:
  - receive an identifier from the tag;
  - determine a certificate from the tag;
  - challenge the tag with a cryptographic challenge, wherein the tag and multiple other tags are challenged with the challenge simultaneously, and at least one of the tags is configured to store its response to the cryptographic challenge for a subsequent reading by the reader;
  - receive a response from the tag;
  - send a first message including at least the identifier, challenge, and response to a verification authority;
  - send a second message including at least the identifier and the certificate to a certification authority;
  - receive a first reply from the verification authority; and
  - receive a second reply from the certification authority.

17. The RFID reader of claim 16, wherein the processor is further configured to determine the certificate by
- constructing the certificate from the tag ID and at least one assertion accessible to the reader.

18. The RFID reader of claim 16, wherein the processor is further configured to at least one of:
- store a plurality of responses from a plurality of tags before sending at least one of the plurality of responses to the verification authority; and
- store a plurality of certificates from the plurality of tags before sending at least one of the plurality of certificates to the certification authority.

19. The RFID reader of claim 16, wherein at least one of the first and second messages further includes at least one of:
- a reader certificate;
- a physical location for the reader; and
- a reader electronic signature.

20. The RFID reader of claim 16, wherein the processor is further configured to cause the tag to send at least one of:
- the response concatenated with the identifier,
- the certificate concatenated with the identifier, and
- the certificate concatenated with the response.

21. The method of claim 1, wherein the property of the item to which the tag is affixed further includes one or more of a make, a model, a country of origin, a size, and a weight of the item.

22. The method of claim 10, wherein the certificate and the response are both concatenated with the identifier in a single message.

23. The RFID reader of claim 16, wherein at least one of the tags is configured to:
- perform a cryptographic operation to determine a cryptographic response based on the cryptographic challenge; and
- store the cryptographic response for a subsequent reading by the reader.

* * * * *